(12) United States Patent
Agata et al.

(10) Patent No.: US 12,391,178 B2
(45) Date of Patent: Aug. 19, 2025

(54) VEHICLE HAVING NO WIPER

(71) Applicants: Yuzo Agata, Tokyo (JP); Hideo Inayoshi, Tokyo (JP)

(72) Inventors: Yuzo Agata, Tokyo (JP); Hideo Inayoshi, Tokyo (JP)

( * ) Notice: Subject to any disclaimer, the term of this patent is extended or adjusted under 35 U.S.C. 154(b) by 163 days.

(21) Appl. No.: 17/595,267

(22) PCT Filed: Jun. 4, 2021

(86) PCT No.: PCT/JP2021/021305
§ 371 (c)(1),
(2) Date: Nov. 12, 2022

(87) PCT Pub. No.: WO2022/137599
PCT Pub. Date: Jun. 30, 2022

(65) Prior Publication Data
US 2024/0034237 A1 Feb. 1, 2024

(30) Foreign Application Priority Data

Dec. 25, 2020 (JP) .................................. 2020-216156
Jan. 18, 2021 (JP) .................................. 2021-005570

(51) Int. Cl.
*B60R 1/00* (2022.01)
*B60R 1/10* (2006.01)
*B60W 50/14* (2020.01)

(52) U.S. Cl.
CPC ................ *B60R 1/001* (2013.01); *B60R 1/10* (2013.01)

(58) Field of Classification Search
CPC ............. B60R 1/001; B60R 1/10; B60R 1/00; B60R 11/02; B60R 11/04; B60W 50/14; G07C 5/00; G08G 1/16
See application file for complete search history.

(56) References Cited

U.S. PATENT DOCUMENTS

| 3,936,148 A | 2/1976 | Ellis |
| 2012/0073896 A1 | 3/2012 | Skoff |

(Continued)

FOREIGN PATENT DOCUMENTS

| EP | 2 913 228 A1 | 9/2015 |
| JP | 50-124661 A | 9/1975 |

(Continued)

OTHER PUBLICATIONS

M. Akhlaq, Tarek R. Sheltami, and Bo Helgeson, Elhadi M. Shakshuki: "Designing an Integrated Driver Assistance System Using Image Sensors"; Jan. 3, 2012; J. Intell Manuf (2012) 23:2109-2132. (Year: 2012).*

(Continued)

*Primary Examiner* — Siamak Harandi
(74) *Attorney, Agent, or Firm* — Sughrue Mion, PLLC

(57) ABSTRACT

A vehicle having no wiper, wherein an image displaying section is provided at a forward portion of a driving seat of the vehicle, a capturing means to capture road conditions of a vehicle forward direction is provided in front of the vehicle, an image display surface of the image displaying section is located in interior side of the vehicle, a captured image captured by the capturing means is displayed on the image display surface, and a driver drives while viewing the captured image displayed on the image display surface.

16 Claims, 12 Drawing Sheets

(56) References Cited

U.S. PATENT DOCUMENTS

| | | |
|---|---|---|
| 2017/0315771 A1 | 11/2017 | Kerr |
| 2020/0154087 A1* | 5/2020 | Numata ................. H04N 23/88 |
| 2021/0044736 A1* | 2/2021 | Kaneko ................. H04N 23/11 |

FOREIGN PATENT DOCUMENTS

| | | | |
|---|---|---|---|
| JP | 11-308609 A | 11/1999 | |
| JP | 2001-344597 A | 12/2001 | |
| JP | 2002-122397 A | 4/2002 | |
| JP | 2005-286577 A | 10/2005 | |
| JP | 2005-286938 A | 10/2005 | |
| JP | 2006-1377 A | 1/2006 | |
| JP | 2007-081787 A | 3/2007 | |
| JP | 2008-504597 A | 2/2008 | |
| JP | 2009-071789 A | 4/2009 | |
| JP | 2013-32082 A | 2/2013 | |
| JP | 2013-242346 A | 12/2013 | |
| JP | 2013-247492 A | 12/2013 | |
| JP | 2014-197727 A | 10/2014 | |
| JP | 2016-71666 A | 5/2016 | |
| JP | 2017-206196 A | 11/2017 | |
| JP | 2018-184119 A | 11/2018 | |
| JP | 2020-023293 A | 2/2020 | |
| JP | 2020-131901 A | 8/2020 | |
| JP | 2020-175889 A | 10/2020 | |

OTHER PUBLICATIONS

Written Opinion for PCT/JP2021/021305 dated Aug. 17, 2021 (PCT/ISA/237).

* cited by examiner

FIG.1A  FIG.1B
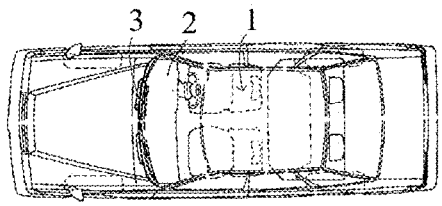
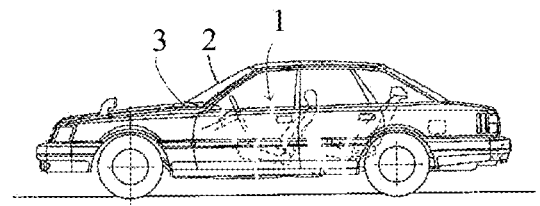
PRIOR ART
FIG.2
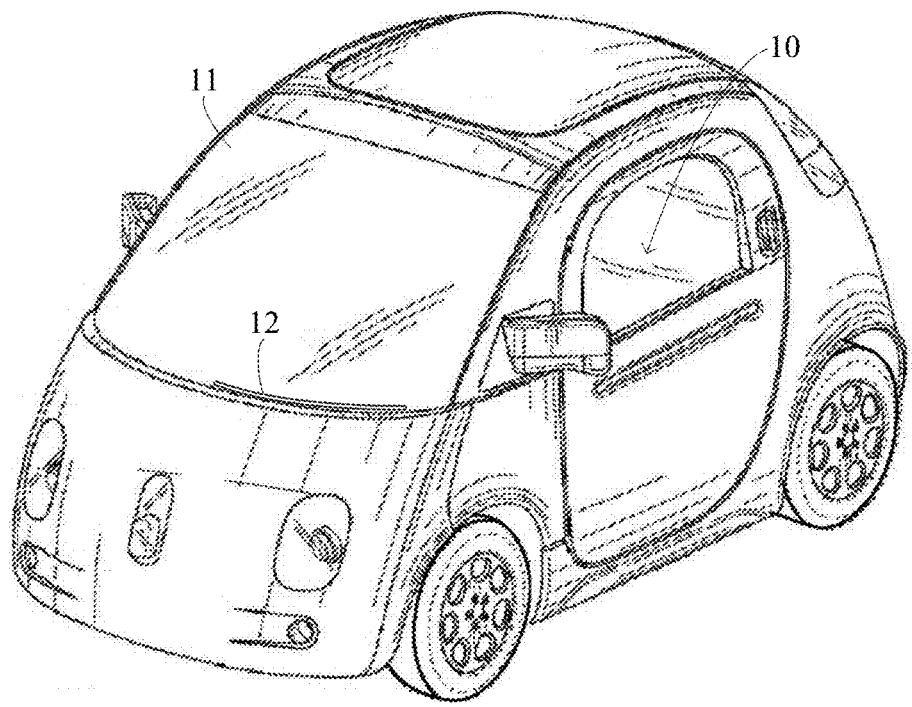
PRIOR ART

FIF.3
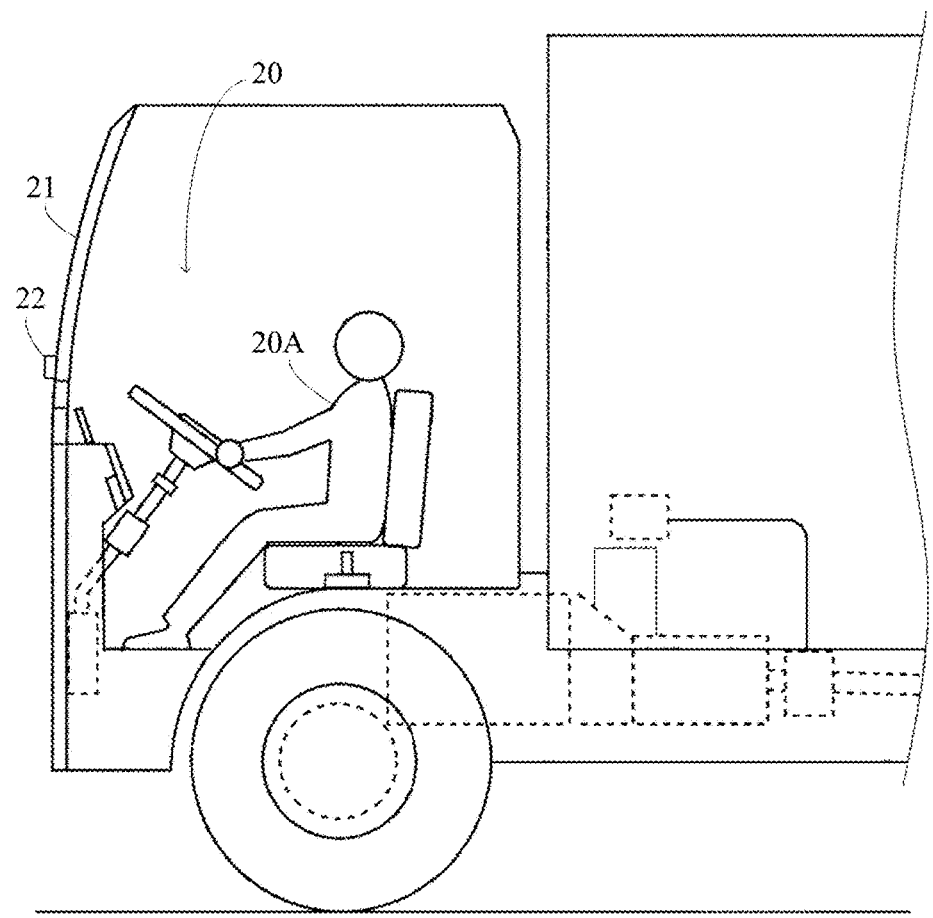
PRIOR ART
FIG.4
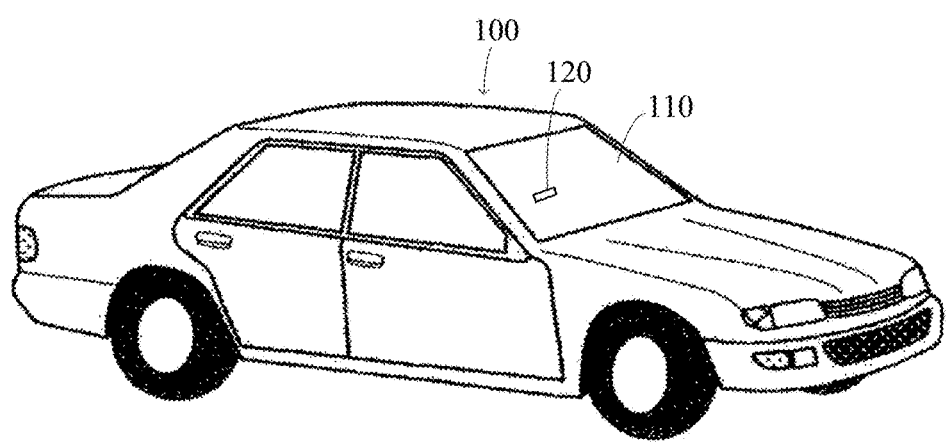

VEHICLE HAVING NO WIPER

CROSS REFERENCE TO RELATED APPLICATIONS

This application is a National Stage of International Application No. PCT/JP2021/021305 filed Jun. 4, 2021, claiming priorities based on Japanese Patent Application No. 2020-216156 filed Dec. 25, 2020 and Japanese Patent Application No. 2021-005570 filed Jan. 18, 2021.

TECHNICAL FIELD

The present invention relates to a vehicle (a passenger car, a taxi, a truck, a dump truck, a trailer, etc.) that can be driven and does not have a wiper, and in particular to the vehicle that a transparent front glass is not provided at a front portion of the vehicle and can be driven while viewing a captured image captured by a front camera, and that further does not have the wiper.

BACKGROUND ART

For example, FIG. 1 shows the appearance of a general passenger car (sedan type), in which a transparent front glass 2 is provided at a forward portion of a driving seat 1, and a driver sitting on the driving seat 1 steers a steering wheel (a handle) to drive the passenger car, by viewing road conditions (landscape) that can be seen through the front glass 2. At that time, if raindrops or the like adhere to the surface of the front glass 2 due to rain or snow, it becomes difficult to see the front and the operation is hindered. Therefore, a wiper 3 for wiping the front glass 2 is provided.

Further, a small one-box car as shown in FIG. 2 is also the same, in which a front glass 11 is provided at the forward portion of the driving seat 10 and a wiper 12 is provided. FIG. 3 shows a front part of the bus (or the truck or the trailer) in cross section, and the driver 20A sitting on the driving seat 20 looks at the road conditions through the front glass 21 on the front and operates the steering wheel to drive. The wiper 22 is provided on the front surface of the front glass 21 to wipe off the raindrops, running water during the rain, snowflakes during the snow, and the like to make it easier to see ahead.

THE LIST OF PRIOR ART DOCUMENTS

Patent Documents

Patent Document 1: Japanese Unexamined Patent Publication No. 2016-71666 A
Patent Document 2: Japanese Unexamined Patent Publication No. 2006-1377 A
Patent Document 3: Japanese Unexamined Patent Publication No. 2013-242346 A
Patent Document 4: Japanese Unexamined Patent Publication No. 2020-131901 A
Patent Document 5: Japanese Unexamined Patent Publication No. 2005-286938 A
Patent Document 6: Japanese Unexamined Patent Publication No. 2020-175889 A
Patent Document 7: Japanese Unexamined Patent Publication No. 2013-32082 A
Patent Document 8: Japanese Unexamined Patent Publication No. 2018-184119 A
Patent Document 9: US 2017/0315771 A1
Patent Document 10: Japanese Unexamined Patent Publication No. 2020-023293 A
Patent Document 11: EP 2913238 B1
Patent Document 12: Japan Unexamined Patent Publication No. 2008-504597 A
Patent Document 13: Japanese Unexamined Patent Publication No. 2013-247492 A

SUMMARY OF THE INVENTION

Problems to be Solved by the Invention

As described above, the conventional car is provided with the transparent front glass, and the driver can drive while observing the road conditions through the front glass. Even vehicles that are autonomously driven (level "0" to level "5") are provided with the front glass. In a case that the front glass is provided, the raindrops and the snowflakes will adhere to the front glass surface when it rains or snows, making it difficult to see ahead and hindering the driving. Accordingly, the vehicle is equipped with the wiper on the forward side of the front glass, and the wiper is swept or rotated to wipe off the raindrops and the snowflakes from the front glass surface. Since the wiper is generally a contact type or a mechanical type, the maintenance work is laborious and costly, and in the case of a heavy rain or a heavy snow, even if the sweep speed or the rotation speed is increased, the wiper wiping effect is not fully shown. The same is true for expensive luxury cars. Further, in heavy snowfall areas, the wiper is damaged due to the weight of the snowfall or frozen.

Although a non-contact wiper has been proposed (Patent Document 8), it is necessary to install a large-scale device separately, and it cannot be practically adopted.

In addition, since the front glass is transparent, when the vehicle travels toward a light source such as the sun or a searchlight, the light enters the driver's eyes, making it dazzling and difficult to drive. When the sun or the light is dazzling, even if sunglasses are worn, it will be difficult to see the forward direction, which will hinder the safe driving. Further, in a night time driving, there is a problem that the visibility of the forward and the surroundings is deteriorated even if the headlights are illuminated.

The present invention has been made under the above-mentioned circumstances, and an object of the present invention is to provide a vehicle having no wiper that requires the maintenance and may not have a sufficient wiping effect, and includes a display unit to project a forward landscape image so that provides the same function as the transparent front glass, and that can be driven while viewing the captured image on the display unit, can be driven with the same visual vision as in the daytime even at the night, and has a function of enhancing the safety and the reliability.

Means for Solving the Problems

The present invention relates to a vehicle having no wiper, the above-described object of the present invention is achieved by that: wherein an image displaying section is provided at a forward portion of a driving seat of the vehicle, a capturing means to capture road conditions of a vehicle forward direction is provided in front of the vehicle, an image display surface of the image displaying section is located in interior side of the vehicle, a captured image captured by the capturing means is displayed on the image display surface, and a driver drives while viewing the captured image displayed on the image display surface, wherein the capturing means comprises a first visible-light sensor and a first infrared-light sensor being a main light system, a second visible-light sensor and a second infrared-light sensor being a sub light system, wherein the capturing means is capable of moving up and down and is adjustable by an operating section, and wherein the captured image is displayed on the image display surface by an image processing means to perform an image synthesis process of the main light system and the sub light system.

Further, the above-described object of the present invention is achieved by that: comprising an image displaying section which comprises a shielding plate located at a vehicle forward side and a display unit located at a forward portion of a drive seat in interior side of the vehicle, and which is provided in a front portion of the vehicle, a sensor member which includes a first visible-light sensor and a first infrared-light sensor being a main light system and a second visible-light sensor and a second infrared-light sensor being a sub light system to capture road conditions of a vehicle forward direction, and which is arranged on the shielding plate, an image synthesis processing means to image-synthesis-process respective video data from the first visible-light sensor and the first infrared-light sensor and the second visible-light sensor and the second infrared-light sensor, and to display the captured image on the display unit, and a sensor abnormality detecting section to detect an abnormality of the main light system, wherein the sensor member has a construction to cover above of the first visible-light sensor and the first infrared-light sensor and the second visible-light sensor and the second infrared-light sensor, wherein a driver drives while viewing the captured image displayed on the display unit, and wherein said main light system is ordinary operated, and the main light system is switched to the sub light system when an abnormality of the main light system is detected by the sensor abnormality detecting section.

Effects of the Invention

Since the vehicle according to the present invention does not have the wiper, the maintenance work is not required at all, the visibility is not obstructed even in the heavy rain or in the heavy snow, and the safe driving can be continued at all times day and night. In addition, since the driving is not performed through the front glass, the light from the sun or the light source is not seen in the eyes, so that the driver can always drive safely. Since the front surface of the vehicle is a shielding plate that replaces the front glass, the front glass will not be damaged by falling objects, making it impossible to drive.

Further, since the field of view can be made wider than the driver's actual field of view, there is an advantage that it can contribute to safer driving and help avoid accidents.

BRIEF DESCRIPTION OF THE DRAWINGS

In the accompanying drawings:

FIGS. 1A and 1B are a plan view and a side view to show an example of a general passenger car, respectively;

FIG. 2 is a perspective view to show an example of a one-box car;

FIG. 3 is a cross sectional view to show a configuration example of a bus (or a truck);

FIG. 4 is a perspective view to show a configuration example of a passenger car according to the present invention;

MODE FOR CARRYING OUT THE INVENTION

Figure 5:
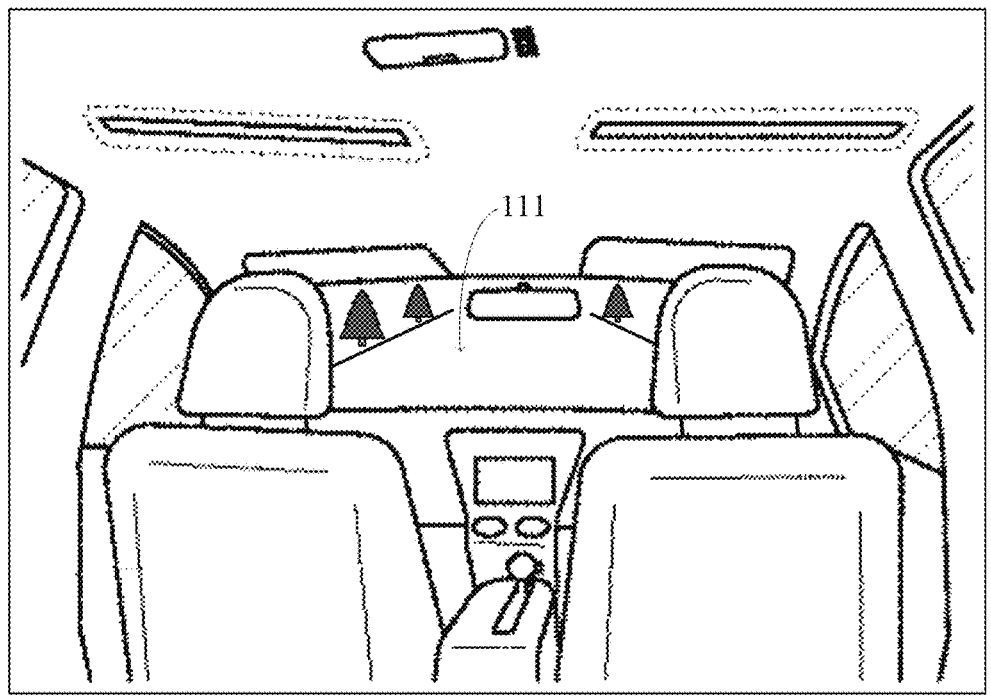
FIG. 5 is a view to show a configuration example in a case that a forward landscape is seen from a rear position in a vehicle interior of the passenger car according to the present invention.

The vehicle according to the present invention does not have a front glass, does not have a wiper for wiping the front glass, and has an image displaying device that projects road conditions (a forward landscape of the vehicle) captured by a wide-angle sensor (camera) having a wide viewing angle (180 [degree]) as a capturing means. The forward landscape of the vehicle is projected on the image displaying device (corresponding to the front glass position), and the driver drives while viewing the displayed image (screen video). The field of view of the driver can be greatly expanded, and a real-time image outside the vehicle can be displayed on the image displaying device during day and night. In addition, when a safety is impaired, the safety measures are taken to prevent accidents by issuing an alarm or blinking hazard lamps to apply an automatic braking. Furthermore, depending on the surrounding conditions, the automatic steering wheel is activated to take measures to avoid a collision and a rear-end collision caused by the automatic braking.

In the vehicle according to the present invention, since the driver drives while viewing the image of the image displaying device, a safety is particularly required, but a high reliability can be achieved by multiplexing and making the system redundant. The redundancy includes a parallel redundancy, a standby redundancy, a majority voting, etc., and is applied to each in mission-critical fields such as space, transportation, finance and the like. In the case of the present invention, when an abnormality (including a failure and a malfunction) is occurred in the system, a real-time property that can be recovered immediately is important, and the parallel redundant method is suitable. For that purpose, the main body, a power supply, cables, memories and so on are duplicated to form a state in which the two systems always perform exactly the same processing. In this case, one is the main system and the other is the sub system (backup). The methods of using these two systems are (1) a mutual monitoring method (dual system), and (2) a replacement method to replace when the abnormality is occurred. In the dual system, the processing results are constantly compared with each other so that the systems can be replaced at any time. In the case of a video projecting system, there is often little need to constantly monitor each other. In this case, when one of them becomes abnormal, it may be replaced with the other system, and this replacement method is simple and cost effective.

When the abnormality is occurred in the main system, the main system detects this abnormality, switches to the sub system at a high speed, and continues the operation without breaking off. That is, the main system first tries to automatically recover from the abnormal state, and switches to the sub system from the main system at the high speed if the abnormality is not recovered. Further, if an abnormality is occurred in the sub system, the sub system tries to recover automatically, and an alarm operation (stop or the like) is performed by the sub system if the abnormal state is not recovered. In order to realize this operation, a shared memory of the two systems is provided, an abnormality flag to notify the occurrence of the abnormality is set in the shared memory, and the value of this abnormality flag is checked with each other. An error is usually detected by an external IC (Integrated Circuit) and an interrupt signal is sent to the CPU (Central Processing Unit) to notify the error. There are a transfer error, a power supply error, a transmission line error or the like as the error, and the external IC is used to monitor them. When the interrupt signal sent from the external IC is detected by the CPU, the processing being executed is suspended and the interrupt processing routine is performed with priority. In the beginning of this interrupt processing routine, the occurrence of the abnormality is registered by setting the abnormality flag in the shared memory. When the flag is read out by the sub system CPU, the sub system starts working as the main system.

Alternatively, more quickly, when the interrupt from the external IC is detected by the main system, there is a method of issuing the interrupt to the CPU of the sub system and notifying the error. When the flag is used, the error occurrence is not checked until one process is completed. However, in the case of the interrupt, the error occurrence is checked every time one instruction is completed. Consequently, the error occurrence is checked for about one to several clocks (for example, when operating at 1 [GHz], the error is recognized by the other CPU in 1 [nsec] to several [nsec]), and the switching process of the main system is started. The high-speed system switching can be realized by the above flag or the interrupt method.

Hereinafter, embodiments of the present invention will be described with reference to the accompanying drawings.

FIG. 4 shows an external appearance of a vehicle (passenger car) 100 according to the present invention, and the body structure itself is the same with a conventional vehicle. However, the vehicle 100 of the present invention does not have a front glass, and there is provided an image displaying section 110 at a whole face of the vehicle front portion instead of the front glass. Further, there is provided a wide-angle sensor member 120 for capturing a forward landscape (road conditions) of the vehicle 100, with a wide viewing angle (viewing angle 180 [degree]), at a front surface (a shielding plate 112) of the image displaying section 110. The image displaying section 110 is a planar shape type structure having the similar size with the conventional front glass and reinforces the structural strength of the vehicle 100. The forward side (outside of the vehicle) is the shielding plate 112 having aesthetics as the vehicle, and the interior side is a display unit 111 comprises of crystalline liquid or the like. In this case, the arrangement position of the wide-angle sensor member 120 is adjustable, in a height position, in accordance with a height of a looking of the driver sit on the driver seat.

FIG. 5 shows a state in a case that a forward landscape is seen from a rear position in the vehicle interior, and the road conditions (landscape) captured by the wide-angle sensor member 120 are displayed on the display unit 111 of the image displaying section 110 at the front area. The time when the road conditions are projected on the display unit 111 is a running time (ignition key ON-time) of the vehicle 100. When the ignition key is an ON-time, the road conditions are projected even if the vehicle 100 is stopped or parked. Accordingly, the driver can always see the road conditions of a vehicle forward direction even if the vehicle 100 is stopped or parked.

Figure 6:
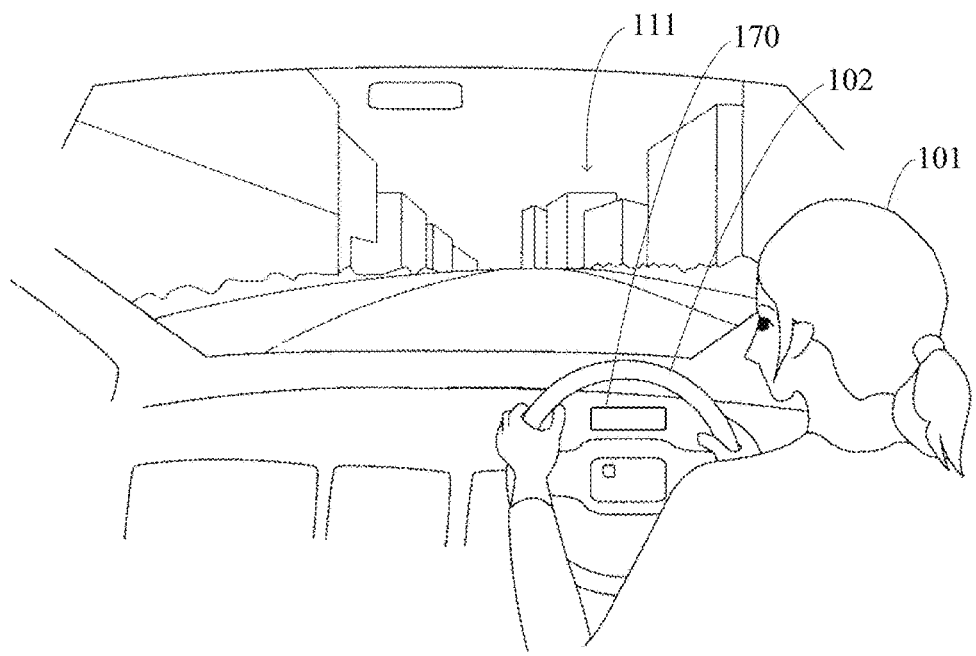
FIG. 6 is a picture diagram to show an example of a display.

Further, FIG. 6 shows an example of the image displayed on the display unit 111, and the driver 101 drives by steering a handle (a steering wheel) 102 while viewing the image on the display unit 111. There is provided a wide-angle sensor-position indicating section 170 (will be described later) on a board in front of the driver seat. Although the vehicle 100 is driven by steering the handle in the embodiment shown in FIG. 6, it is the same with an autonomous car (self-driving car). NHTSA (National Highway Traffic Safety Administration) adopted a definition of the autonomous driving level of SAE (Society of Automotive Engineers) in 2016. That is, the autonomous driving level is classified to "level 0" without the autonomous driving function, "level 1" of the driver assist, "level 2" with a partial autonomous driving function, "level 3" with the autonomous driving function with conditions attached, "level 4" of the high autonomous driving function" and "level 5" of the full automatic operation. The present invention can be applied to the vehicle of the all levels.

Figure 7A:
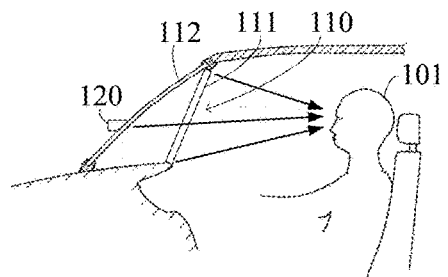
FIGS. 7A and 7B are cross sectional views to show a relation between a driver and the image displaying section.
Figure 7B:
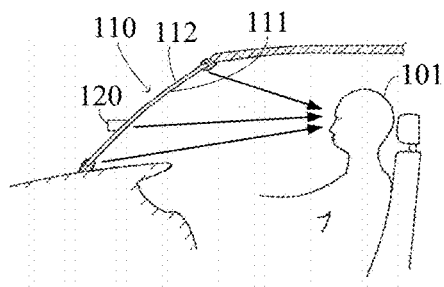

FIGS. 7A-7B show a construction example of a relation between the driver 101 and the image displaying section 110 (the display unit 111). FIG. 7A shows an example in a case that the shielding plate 112 and the display unit 111 are separated, and FIG. 7B does an example in a case that the shielding plate 112 and the display unit 111 are integrated. That is, FIG. 7A shows a constructional example of the image displaying section 110 that: the shielding plate 112 is provided at the front portion of the vehicle so as to protect a rain infiltration into the car interior and to reinforce the constructional intensity, the wide-angle sensor member 120 is provided on the shielding plate 112, and the display unit 111 is provided at an interior position separated from the shielding plate 112. According to this example, since the display unit 111 and the shielding plate 112 are separated each other, it is possible to enhance the intensity of the passenger car by manufacturing the shielding plate 112 with strong materials. Further, FIG. 7B shows another constructional example of the image displaying section 110 that: the integrated type image displaying section 110 is directly provided on the front portion of the vehicle, the wide-angle sensor member 120 is provided on the back surface of the image displaying section 110 or the shielding plate 112 of the forward side of the vehicle, and the surface of the image displaying section 110 or an inside portion of the vehicle is the display unit 111.

Although any construction may be adopted, in the integrated type case of FIG. 7B, it is needed to correct a perspective sensation by the image processing since a mounting angle of the display unit 111 becomes greater for the looking of the driver 101. For example, a method that the distant image is displayed smaller than near so as to converge the surroundings serving as a vanishing point to an image center by using the perspective or the like, is used. Further, since the shielding plate 112 is located at the forward side of the vehicle 100, the front surface side (the forward side) is a curved shape similar to the conventional front glass so as to decease the air resistance.

The display unit 111 of the wide-angle sensor member 120 according to the present invention has a visual function in the same or more superior function that the driver views the forward landscape through the conventional front glass in the normal time, or even for the rainy time and the snow time, or in the night. In this connection, the present invention uses the dual system of the visible-light wide-angle sensor of the visible-light and the infrared-light wide-angle sensor suitable for the night. Since the driver drives while looking at the image of the display unit 111 based on the capturing of the wide-angle sensors, an abnormality (incident) occurrence of the wide-angle sensor system is especially important. Consequently, the present invention adopts the dual system including the backup system for the sensor system and the image processing system so as not to injure a safety and a reliability. Further, the present invention also takes a safety measure.

Figure 8:
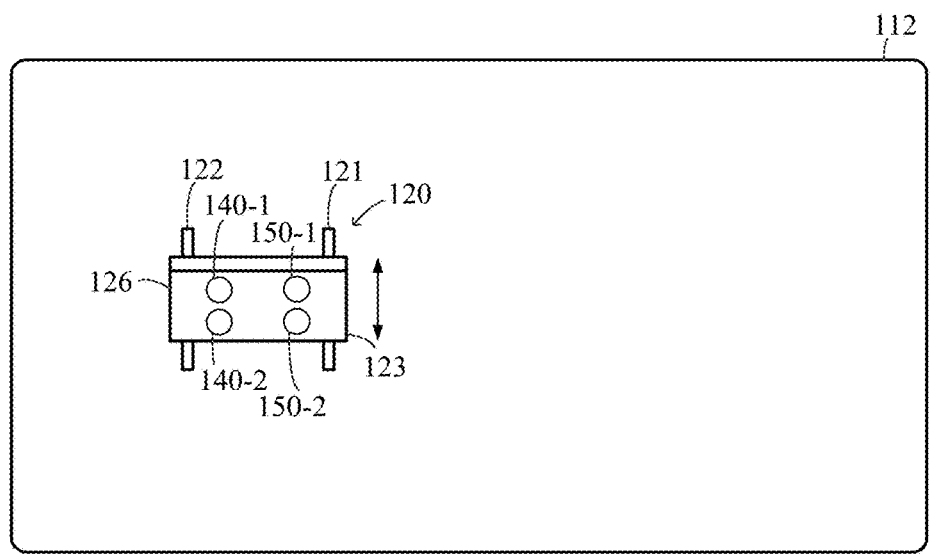
FIG. 8 is a plan view to show an arrangement example of wide-angle sensors.

FIG. 8 shows a state to mount the wide-angle sensor member 120 on the shielding plate 112, and it is a plan construction of a case that the shielding plate 112 of the vehicle 100 is seen from the forward side. The wide-angle sensor member 120 has a mounting table 126 of which cross section is a character "L" shape, and there are provided visible-light wide-angle sensor 140-1 and 140-2 with viewing angle 180 [degree] and infrared-light wide-angle sensor 150-1 and 150-2 with viewing angle 180 [degree] on a bottom of the mounting table 126. The visible-light wide-angle sensor 140-1 and the infrared-light wide-angle sensor 150-1 comprise a main sensor light system, and the visible-light wide-angle sensor 140-2 and the infrared-light wide-angle sensor 150-2 comprise a sub sensor light system being the backup. This plan of the sensor arrangement is not limited to FIG. 8 and optionally changeable.

Since the looking position (height) of the driver is different due to a driver height (upper back) and the height of the driving seat, the visible-light wide-angle sensor 140-1 and 140-2 and the infrared-light wide-angle sensor 150-1 and 150-2 are up and down movable via guide grooves 121 and 122 so as to match with the looking position of the driver and be arranged. Thereby, it is possible to get the captured image matched with the looking height of the driver. Further, the position of the wide-angle sensor member 120 depends on the right-steering wheel specification car or the left-steering wheel specification car. Although FIG. 8 shows the mounting position in the case of the right-steering wheel specification car, it is similarly capable of applying to the left-steering wheel specification car.

Figure 9:
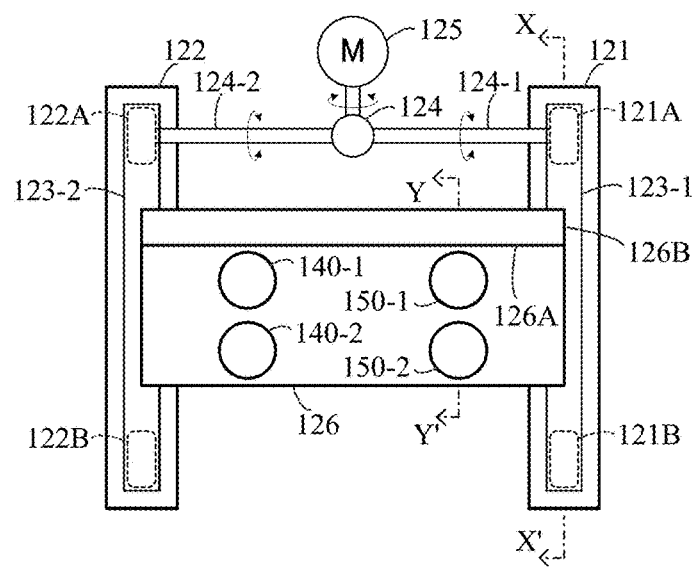
FIG. 9 is a detail configuration view of FIG. 8.
Figure 10:
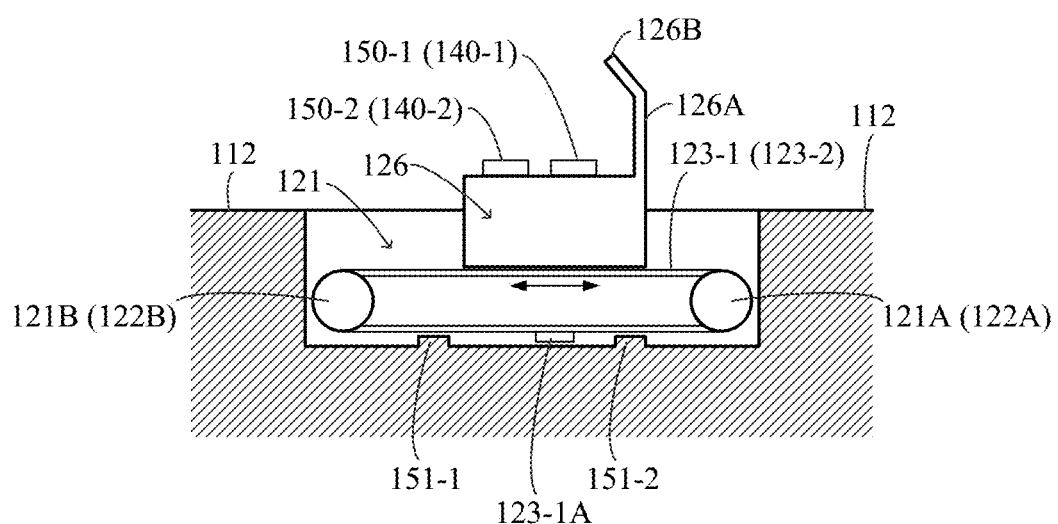
FIG. 10 is a cross sectional view to show an X-X' lien in FIG. 9.
Figure 11:
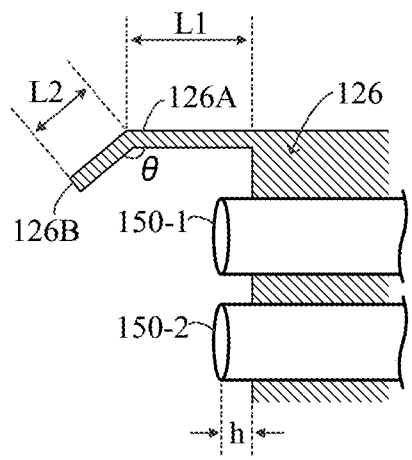
FIG. 11 is a cross sectional view to show a Y-Y' lien in FIG. 9.

FIG. 9 shows the details of the wide-angle sensor member 120 with the plan view, FIG. 10 is a cross sectional view showing an X-X' lien in FIG. 9, and FIG. 11 is a cross sectional view showing a Y-Y' lien in FIG. 9. A pair of wheels 121A and 121B is provided in a longitudinal guide groove 121 drilled, up and down, in the shielding plate 112, and a pair of wheels 122A and 122B is provided in a longitudinal guide groove 122 drilled, up and down, in the shielding plate 112. A belt 123-1 is wound on the wheels 121A and 121B, and a belt 123-2 is wound on the wheels 122A and 122B. A rotation converting section 124 comprising of a warm gear and the like is connected to an output shaft of a fixed driving motor 125, and rotational shafts 124-1 and 124-2 are extended to both sides of the rotation converting section 124. The wheel 121A is fixed to the rotational shaft 124-1, and the wheel 122A is fixed to the rotational shaft 124-2. Therefore, the wheels 121A and 122A are rotated via the rotation converting section 124 and the rotational shafts 124-1 and 124-2 by making rotate the driving motor 125.

The bottom of the mounting table 126 of which cross section is a character "L" shape is fixed on the upper surfaces of the belts 123-1 and 123-2. The mounting table 126 moves (up and down) in accordance with movement of the belts 123-1 and 123-2. Since the visible-light wide-angle sensors 140-1 and 140-2 as well as the infrared-light wide-angle sensors 150-1 and 150-2 are fixed to the bottom of the mounting table 126, the visible-light wide-angle sensors 140-1 and 140-2 as well as the infrared-light wide-angle sensors 150-1 and 150-2 move in accordance with the movement of the mounting table 126. Thereby, it is possible to adjust the height of the sensors, and further it is possible to capture with the driver's looking.

Further, a projection 123-1A is provided on the lower surface of the belt 123-1 (or the belt 123-2, or the both), and the stopping members 121-1 and 121-2 are projected on the bottom surface of the corresponding guide groove 121 (or 122, or both). By limiting the movement of the projection 123-1A with the stopping members 121-1 and 121-2, the up and down movement scope of the wide-angle sensor member 120 is also limited. Accordingly, there is no accident so that the mounting table 126 collides with the guide grooves 121 and 122 of the shielding plate 112 and is damaged.

Furthermore, a wall member 126A is vertically provided on the upper portion of the mounting table 126 so that the rain or the snow does not adhere to the front surfaces of the wide-angle sensors 140-1, 140-2 and 150-1, 150-2. The downward-bended lean-to roof 126B is provided at a tip portion of the wall member 126A so that the lean-to roof 126B covers the wide-angle sensors 140-1, 140-2 and 150-1, 150-2. In other words, like the details are shown in FIG. 11, the wall member 126A which the height is "L1" is vertically provided at an end portion of the bottom of the mounting table 126, and the lean-to roof 126B of which inclination is "θ" and the length is "L2" is provided from the tip of the wall member 126A. The height L1 of the wall member 126A and the inclination θ and the length L2 are optionally changeable, and they are in advance set so that the rain and the snow do not adhere to the front surface of the wide-angle sensors 140-1, 140-2 and 150-1, 150-2.

Figure 12:
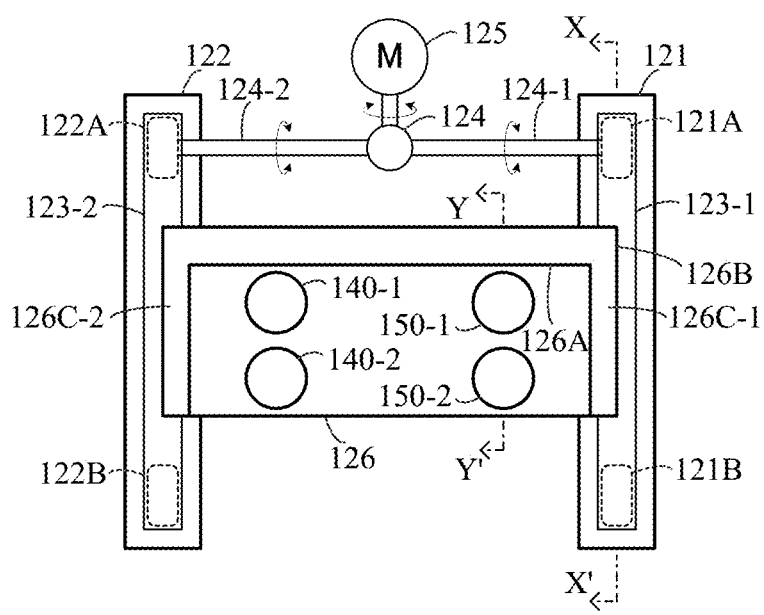
FIG. 12 is a configuration view to show a variation example of a mounting table.
Figure 13:
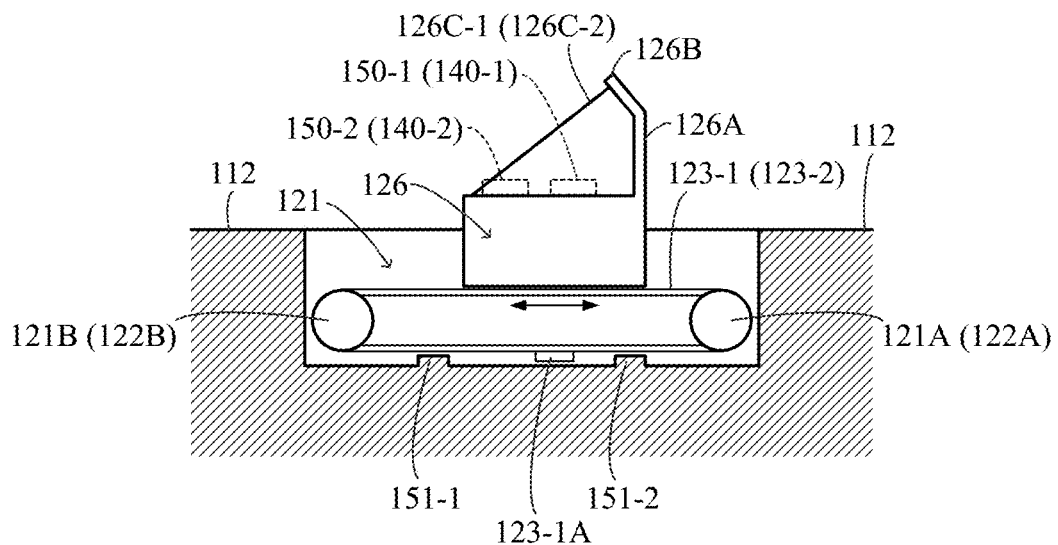
FIG. 13 is a cross sectional view to show a variation example of the mounting table.

Although the wide-angle sensors 150-1 and 150-2 are protuberated with the height "h" from the bottom surface of the mounting table 126 in the above embodiment, it may be "h=0". As long as the capturing does not have a negative influence, the construction buried from the surface may be adopted. Other sensors 140-1 and 140-2 are also the same. Further, although the bottom ends of the mounting table 126 are a penetration structure, triangular protective wall 126C-1 and 126C-2 may be respectively provided at the bottom ends as shown in FIGS. 12 and 13. The protective wall 126C-1 and 126C-2 perfectly protect the incursion of the rain and the snow from the lateral direction for the vehicle travelling direction.

Figure 14:
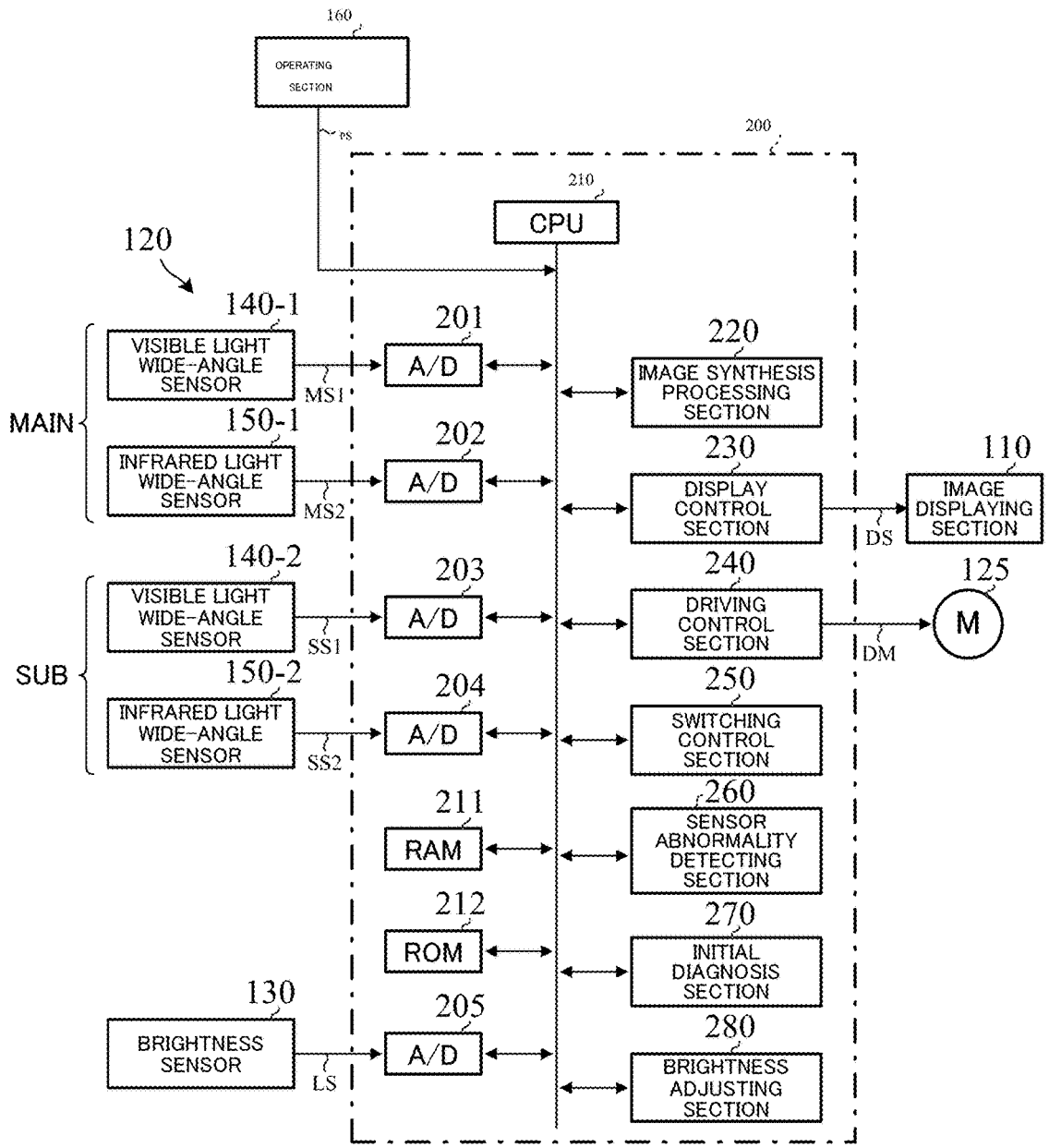
FIG. 14 is a block diagram to show a configuration example (the first embodiment) of the control section.

FIG. 14 shows a constructional embodiment (the first embodiment) of the control section 200 according to the present invention, there is provided a CPU (Central Processing Unit, including an MCU (Micro Controller Unit), an MPU (Micro Processor Unit)) 210 which performs a whole control. To the CPU 210, a ROM (Read Only Memory) 212 which stores the program, the data and so on and a RAM (Random Access Memory) 211 which memorizes the data, the information and serves as a video memory for image processing are mutually connected.

Video data MS1 and MS2 from the visible-light wide-angle sensor 140-1 and the infrared-light wide-angle sensor 150-1 being the main sensor light system are respectively digital-converting processed at A/D (analog to digital) converting sections 201 and 202 and then are inputted to the control section 200. Video data SS1 and SS2 from the visible-light wide-angle sensor 140-2 and the infrared-light wide-angle sensor 150-2 being the sub sensor light system are respectively digital-converting processed at A/D converting sections 203 and 204 and then are inputted to the control section 200. Further, video data LS from the brightness sensor 130 is digital-converting processed at A/D converting sections 205 and then is inputted to the control section 200. As well, it is possible to substitute a sensor for the automatic turn-on/turn-off of the head lights for the brightness sensor 130. The A/D converting sections 201 to 205 are sometimes included in chips in the sensors. In this case, the respective video data being digital-converting processed are directly inputted to the control section 200.

Further, to the CPU 210, an image synthesis processing section 220 which synthesizes the visible-light video data and the infrared-light video data and performs a necessary image process, a brightness adjusting section 280 which adjusts the brightness of the image display in accordance with an external brightness, a display control section 230 which outputs an image signal DS for displaying the image synthesis-processed and brightness-adjusted image on the image displaying section 110, a driving control section 240 which drive-controls the driving motor 125 with a driving signal DM, a switching control section 250 which is switched to the sub sensor light system when the main sensor light system becomes abnormal, a sensor abnormality detecting section 260 and an initial diagnosis section 270 which performs an initial diagnosis of basic items such as the voltage, the current and so on are mutually connected. An operation signal PS from an operating section 160 due to the operation of the driver is also inputted to the control section 200, and the image synthesis processing section 220 also performs a generation of RGB-image, a brightness adjustment, a white balance adjustment, a sharpness adjustment, a contrast adjustment, a superimpose of the images, an enhancement of a specific portion and so on.

As well, since the infrared wave is seen by a reflection of the infrared light (single color), the captured image is single color. Therefore, it is necessary to perform a coloring process (RGB) and the like to get a good image.

The image synthesis processing section 220 comprises a GDC (Graphics Processing Display Controller) to perform the image processing cooperating with the CPU 210. The GDC comprises a GPU (Graphics Processing Unit), an FPGA (Field-Programmable Gate Array), an ASIC (application Specific Integrated Circuit) and the like.

Further, the control section 200 is connected to an in-vehicle network such as CAN (Controller Area Network) and is constructed by using at least one specification such as LIN (Local Interconnect Network), Flex Ray (registered trade mark), Ethernet (registered trade mark), MOST (Media Oriented Systems Transport) and the like. In a case of a wireless connection, it is possible to use wireless LAN (IEEE 802.11a/b/g), Bluetooth (registered trade mark), infrared ray (IrDA), UWB (Ultra Wide Band) and the like. Thereby, the control section 200 is capable of commonly having the data and information (for example, a vehicle speed, an engine rotational speed, a temperature and the like) of the in-vehicle network.

Figure 15:
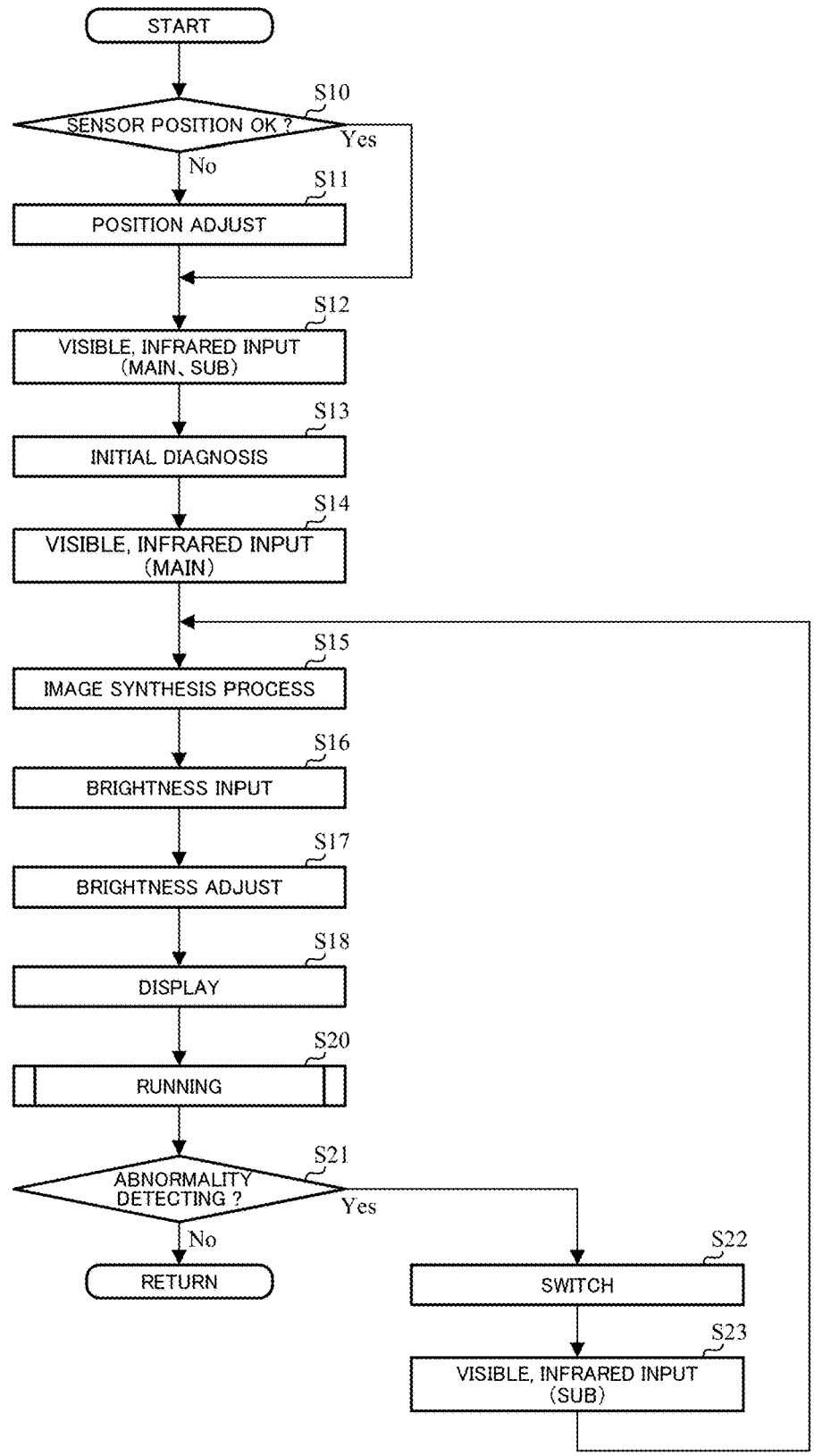
FIG. 15 is a flowchart to show an operating example (the first embodiment) of the present invention.

In this constitution, the operation example (the first embodiment) will be described with reference to a flowchart of FIG. 15.

First, after the ignition Key is turned-on, it is judged that the height position of the wide-angle sensor member 120 is matched with the driver's height by checking a wide-angle sensor position indicating section 170 mounted in the board or the like at the front portion of the driver seat (Step S10). In a case that the position of the wide-angle sensor does not match for the driver, the position of the wide-angle sensor is adjusted by driving the driving motor 125 through the driving control section 240 with an instruction from the operating section 160 (Step S11). Since a relation between an actual height of the wide-angle sensor and an indication of the wide-angle sensor position indicating section 170 is in advance obtained, it is possible to adjust the height without the image display by actually enabling the wide-angle sensor. Further, it is always possible to adjust the height by operating the operating section 160 even the running time after the wide-angle sensor enabling.

After the above height adjustment or when the height of the wide-angle sensor member 120 is good, the video data MS1 and MS2 from the visible-light wide-angle sensor 140-1 and the infrared-light wide-angle sensor 150-1 being the main sensor light system are inputted, and the video data SS1 and SS2 from the visible-light wide-angle sensor 140-2 and the infrared-light wide-angle sensor 150-2 being the sub sensor light system are inputted (Step S12). Next, the initial diagnosis is performed at the initial diagnosis section 270 whether the basic items such as the voltage, the current or the like are normal or not (Step S13). In a case that the abnormal is not occurred, the video data MS1 and MS2 from the visible-light wide-angle sensor 140-1 and the infrared-light wide-angle sensor 150-1 being the main sensor light system are inputted (Step S14). Then, the video data MS1 and MS2 from the visible-light wide-angle sensor 140-1 and the infrared-light wide-angle sensor 150-1 being the main sensor light system are image-synthesis-processed at the image synthesis processing section 220 (Step S15). The brightness signal LS from the brightness sensor 130 is inputted (Step S16) and is brightness-adjusted at the brightness adjusting section 280 (Step S17). The image-synthesis-processed and brightness-adjusted image is displayed on the image displaying section 110 (the display unit 111) by the image signal DS via the display control section 230 (Step S18). The image displayed on the display unit 111 is the image which is captured by the visible-light wide-angle sensor 140-1 and the infrared-light wide-angle sensor 150-1, and is the image of the forward landscape (the road conditions) of the vehicle. The driver drives while viewing the projected image (Step S20).

During the running of the vehicle, the sensor abnormality detecting section 220 always detects whether the sensor portions are normal or not (Step S21). The process is retuned in a case that the sensor portions are judged to be normal, and the main sensor light system is switched to the sub sensor light system via the switching control section 250 in a case that the sensor portion is judged to be abnormal (Step S22). Thereby, the video data SS1 and SS2 from the visible-light wide-angle sensor 140-2 and the infrared-light wide-angle sensor 150-2 being the sub sensor light system are inputted (Step S23). Then, the video data SS1 and SS2 from the visible-light wide-angle sensor 140-2 and the infrared-light wide-angle sensor 150-2 are image-synthesis-processed at the image synthesis processing section 220 (Step S15). Thereafter, the described above operations are repeated.

As well, it is possible to adjust, as needed, the height of the sensor by handling the operating section 160 even during the driving. Further, it is also possible to adjust the brightness of the display unit 111 by handling the operating section 160. Furthermore, it is possible to continue the running by switching the main sensor light system to the sub sensor light system by the operating section 160 even if the main sensor light system is not abnormal in a case that the driver cannot see good the projected good image due to the adhesion of the raindrops or the like to the sensor surface.

Recently, the image displaying device named as a head-up display (HUD) is developed and is mounted on a movable body such as the passenger car and the like. In the head-up display mounted on the passenger car, the light modulated by the image information is projected on a windshield (a front glass), and the reflected light is irradiated on the eyes of the driver. Thereby, the driver can see a virtual image in a front of the windshield. For example, although the vehicle speed and the external temperature are displayed as the virtual image, it is possible to project the virtual image of the head-up display on the display unit 111 of the present invention.

Although the display unit 111 may be a liquid crystal display, display devices such as OLED (Organic Light Emitting Diodes), DMD (Digital Micro mirror Device), LCOS (Liquid Crystal On Silicon) or the like are usable in the case of displaying the virtual image of the head-up display.

Further, it is possible to directly record the image signal DS from the display control section 230 in an image memory. Thereby, the vehicle of the present invention has a function of a drive recorder. According to a general drive recorder, a capturing camera is mounted on an inner surface of the front glass, the captured image is memorized in an SD (secure digital) memory card through the image memory, and the SD memory card is read out so as to obtain the image. Therefore, it is not a real time for the image. Further, in the general drive recorder, since the capturing camera is mounted on the position where the driver's eyesight is not prevented or the position of the front glass where the wiper does not reach, an inconvenience not to obtain a clear image occurs due to the raindrops or the snowflake in the time of the rain or snow. On the contrary, according to the present invention, since the image is displayed on the display unit 111 while capturing with the capturing means and is directly stored in the image memory (recorder), it has a real time property and has advantages to always obtain the clean image without an influence of the rain and so on. As well, the RAM 211 may be used as the image memory (recorder).

Figure 16:
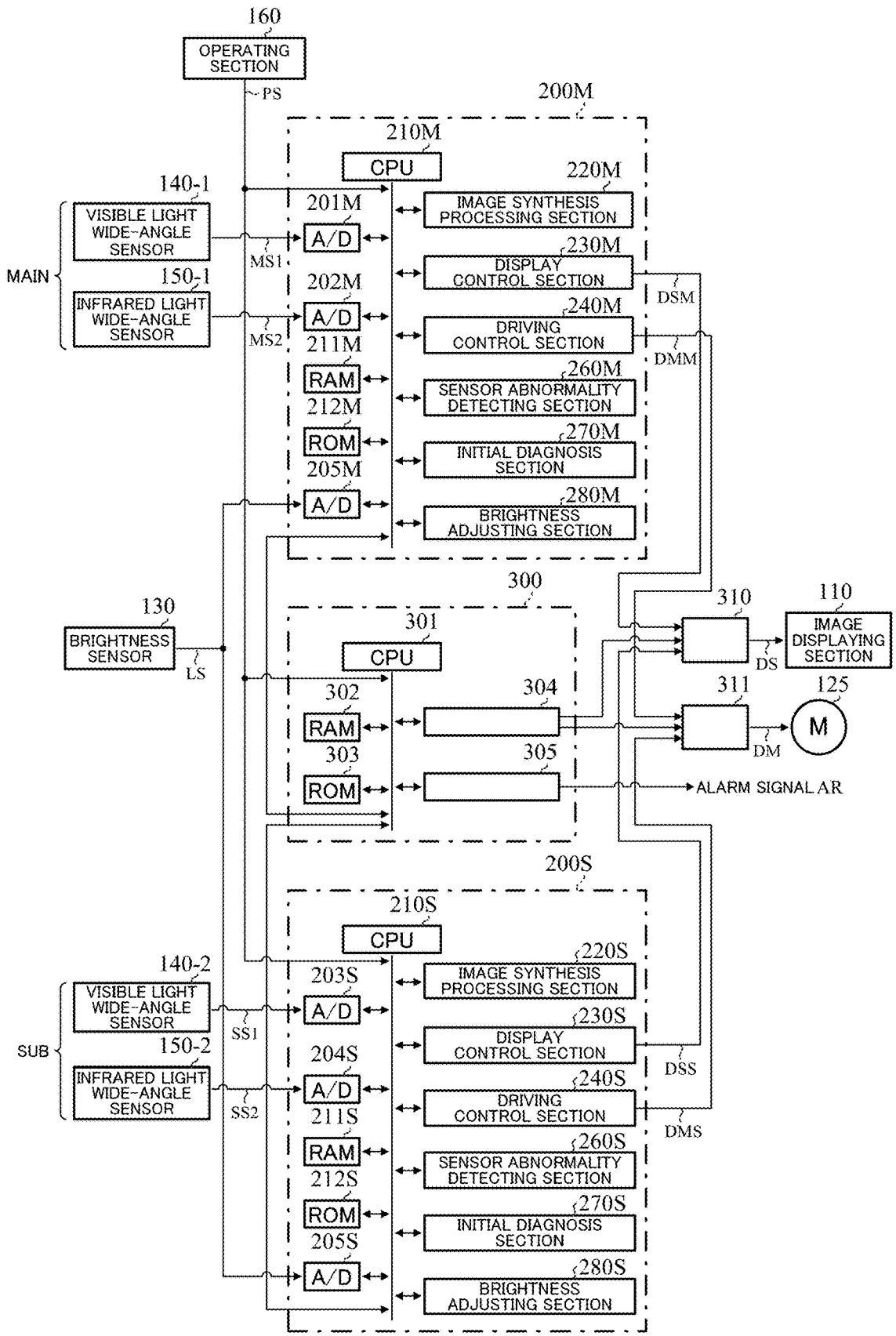
FIG. 16 is a block diagram to show a configuration example (the second embodiment) of the control section.

FIG. 16 shows a constructional embodiment (the second embodiment) of the control section according to the present invention, and the safety and the reliability are enhanced. In the second embodiment, there are provided a main control section 200M being a main sensor light system, a sub control section 200S being a sub sensor light system and a whole control section 300 to perform a whole control. Similarly, the image is displayed on the display unit 111 and the height of the wide-angle sensor is adjusted by driving the driving motor 125.

Although the video data from the wide-angle sensor and the signal and data outputting are different, the control sections 200M and 200S are the same construction. That is, the video data MS1 and MS2 from the visible-light wide-angle sensor 140-1 and the infrared-light wide-angle sensor 150-1 being the main sensor light system are inputted to the main control section 200M, and the video data SS1 and SS2 from the visible-light wide-angle sensor 140-2 and the infrared-light wide-angle sensor 150-2 being the sub sensor light system are inputted to the sub control section 200S. The brightness signal LS is inputted to the main control section 200M and the sub control section 200S. Although the brightness sensor 130 is single since the brightness of the display unit 111 is not the most important subject, two brightness sensor may be provided for the main and sub.

Although the main control section 200M will be described, the construction and operation of the sub control section 200S are the same.

The main control section 200M includes a CPU (including an MCU, an MPU) 210M which performs a whole control. To the CPU 210M, a ROM 212M which stores the program, the data and so on and a RAM 211M which memorizes the data, the information and serves as a video memory for image processing are mutually connected.

Video data MS1 and MS2 from the visible-light wide-angle sensor 140-1 and the infrared-light wide-angle sensor 150-1 being the main sensor light system are respectively digital-converting processed at A/D converting sections 201M and 202M and then are inputted to the control section 200M. The brightness signal LS from the brightness sensor 130 is digital-converting processed at A/D converting sections 205M and then is inputted to the main control section 200M. To the CPU 210M, an image synthesis processing section 220M which synthesizes the visible-light video data and the infrared-light video data and performs a necessary image process, a display control section 230M which outputs an image signal DSM for displaying the image synthesis-processed and brightness-adjusted image on the image displaying section 110, a driving control section 240M which outputs a driving signal DMM to drive-control the driving motor 125, a sensor abnormality detecting section 260M to detect an abnormality (including the breakdown and the failure) of the sensor light system and an initial diagnosis section 270M which performs an initial diagnosis of basic items such as the voltage, the current and so on are mutually connected. As well, the image synthesis processing section 220M performs a generation of RGB-image, a brightness adjustment, a white balance adjustment, a sharpness adjustment, a contrast adjustment, a superimpose of the images, an enhancement of a specific portion and so on.

Further, the whole control section 300 including the CPU 301 is mutually connected to the control sections 200M and 200S. The whole control section 300 includes a RAM 302 and a ROM 303 and comprises a switching control section 304 to switch switching sections 310 and 311 and an abnormality detecting section 305 to detect a whole abnormal state.

Figure 17:
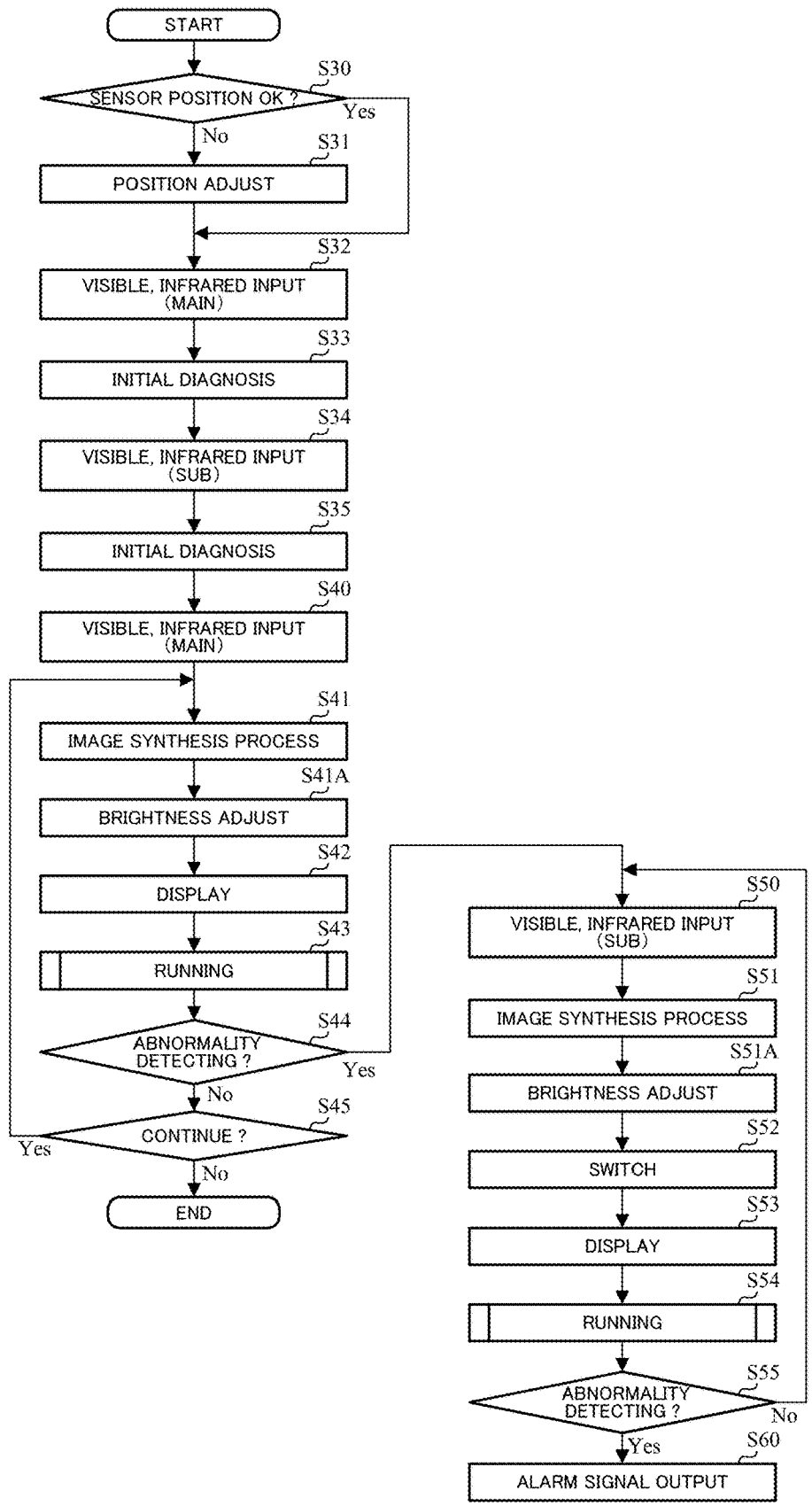
FIG. 17 is a flowchart to show an operating example (the second embodiment) of the present invention.

In this constitution, the operation example (the second embodiment) will be described with reference to a flowchart of FIG. 17.

Also in this embodiment, after the ignition Key is turned-on, it is judged that the height position of the wide-angle sensor member 120 is matched with the driver's height by checking a wide-angle sensor position indicating section 170 (Step S30). In a case that the position of the wide-angle sensor does not match for the driver, the position of the wide-angle sensor is adjusted by driving the driving motor 125 through the driving control section 240M with an operation signal PS from the operating section 160 (Step S31). In this case, the switching section 311 selects a driving signal DMM from the driving control section 240M in the main control section 200M by the switching control section 304 at an initial state.

After the above height adjustment or when the height of the wide-angle sensor member 120 is good, the video data MS1 and MS2 from the visible-light wide-angle sensor 140-1 and the infrared-light wide-angle sensor 150-1 being the main sensor light system are inputted to the main control section 200M by the whole control section 300 (Step S32). Then, the initial diagnosis is performed at the initial diagnosis section 270M whether the basic items such as the voltage, the current or the like are normal or not (Step S33). In a case that the abnormal is not occurred in the above initial diagnosis, the video data SS1 and SS2 from the visible-light wide-angle sensor 140-2 and the infrared-light wide-angle sensor 150-2 being the sub sensor light system are inputted to the sub control section 200S by the whole control section 300 (Step S34). Similarly, the initial diagnosis is performed at the initial diagnosis section 270S whether the basic items such as the voltage, the current or the like are normal or not (Step S35).

In a case that the abnormal is not occurred in the above initial diagnosis, the video data MS1 and MS2 from the visible-light wide-angle sensor 140-1 and the infrared-light wide-angle sensor 150-1 being the main sensor light system are inputted to the main control section 200S by the whole control section 300 (Step S40). Then, the video data MS1 and MS2 are image-synthesis-processed at the image synthesis processing section 220M (Step S41) and the brightness is adjusted at the brightness adjusting section 280M (Step S41A). The image signal DSM is outputted from the display control section 230M and the image is displayed on the image displaying section 110 (the display unit 111) via the switching section 310 (Step S42). During the running, the driver drives while viewing the projected image (Step S43).

During the running, the abnormality detecting section 260M detects whether the sensor section and the main control section 200M are normal or not (Step S44) and judges whether the running is to be continued or not in the normal state (Step S45). The process is returned to the Step S41 in a case to be continued, and the running is stopped (the ignition key is "OFF") in a case not be continued.

Further, in a case that the abnormality is judged at the above Step S44, the video data SS1 and SS2 from the visible-light wide-angle sensor 140-2 and the infrared-light wide-angle sensor 150-2 being the sub sensor light system are inputted to the sub control section 200S by switching control section 304 in the whole control section 300 (Step S50). Then, the video data SS1 and SS2 are image-synthesis-processed at the image synthesis processing section 220S (Step S51) and the brightness is adjusted at the brightness adjusting section 280S (Step S51A). The image signal DSS is outputted from the display control section 230S. Simultaneously, the switching section 310 is switched from the main control section 200M to the sub control section 200S by the switching control section 304 (Step S52) and the image is displayed on the image displaying section 110 (the display unit 111) due to the image signal DSS (Step S53). During the running, the driver drives while viewing the captured image (Step S54).

During the running of the vehicle, the sensor abnormality detecting section 260S always detects whether the sensor portions and the sub control section 200S are normal or not (Step S55). The process is returned to the above Step S50 in a case that the sensor portions and the sub control section 200S are judged to be normal and the above operations are repeated. On the contrary, in a case that the sensor abnormality detecting section 260S detects the occurrence of the abnormality, an alarm signal AR is outputted from the abnormality detecting section 305.

In the second embodiment, it is also possible to directly record the image signal DS from the switching section 310 in an image memory. Thereby, the vehicle of the present invention has a function of a drive recorder. Although the general drive recorder is described above, in the second embodiment, it is possible to directly record the image signal DS which is displayed on the image displaying section 110 via the switching section 310 in the image memory (recorder) while capturing. Therefore, the present invention has a real time property and has advantages to always obtain the clean image. The RAM 302 (or the RAM 211M, the RAM 211S) may be used as the image memory (recorder).

As well, although the main light system and the main control system are respectively switched to the sub light system and the sub control system when the abnormality is occurred in the main light system or the main control system, it is possible to continue the running by switching the main sensor light system to the sub sensor light system by the operating section 160 even if the main sensor light system is normal in a case that the driver cannot see good the captured image due to the adhesion of the raindrops or the like to the sensor surface.

On the other hand, in the state where the alarm signal AR is outputted at the Step S60, it is conceivable that the image is not displayed on the image displaying section 110. In the present invention, the following measures are taken for the vehicle safety.

Figure 18:
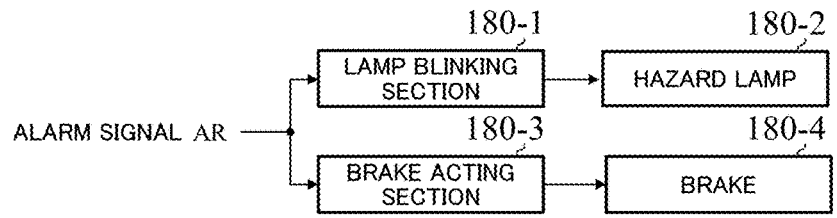
FIG. 18 is a block diagram to show a processing example (the first example) of the alarm signal.

FIG. 18 shows the first example, in which the alarm signal AR is inputted to a lamp blinking section 180-1, and then hazard lamps 180-2 are blinked. Further, the alarm signal AR is inputted to the brake acting section 180-3, and then brake 180-4 is gradually applied. If the vehicle suddenly stops, there is a risk of being hit by a following vehicle, so the brakes are applied gradually. Thereby, the vehicle automatically and gradually stops while alerting the surrounding area by blinking the hazard lamps 180-2. Of course, the driver may apply the brakes.

Figure 19:
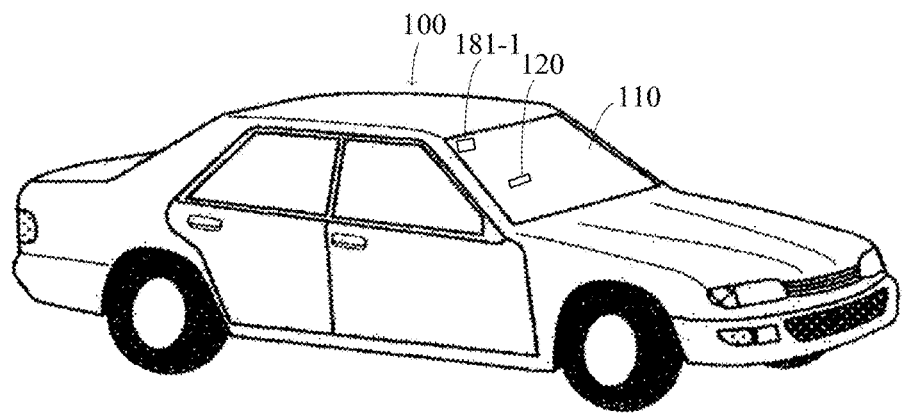
FIG. 19 is a perspective view to show a mounting example of a spear camera for the sake of a processing example (the second example) of the alarm signal.
Figure 20:
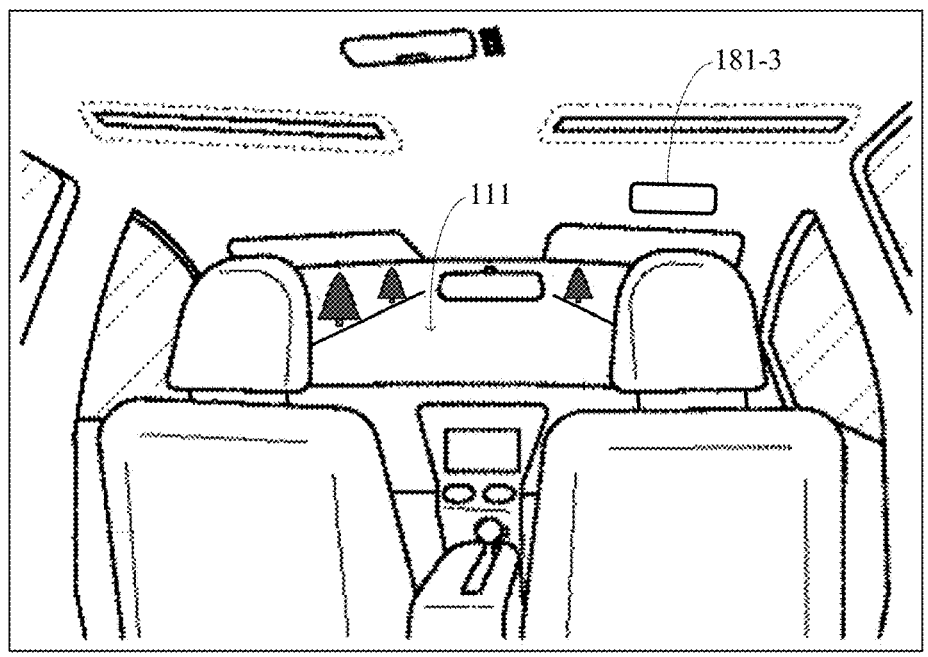
FIG. 20 is a view of the vehicle interior to show a mounting example of an image displaying section for the sake of a processing example (the second example) of the alarm signal.

In the second example, the spare camera 181-1 is installed on the front external part of the vehicle as shown in FIG. 19, and the small image displaying unit 183-1 is installed at an appropriate position inside the vehicle as shown in FIG. 20. That is, a small and simple image capturing means is preliminarily prepared. The video signal from the spare camera 181-1 is processed by the general image processing unit 181-2, and when the alarm signal AR is inputted, the image is displayed on the image displaying unit 181-3 inside the vehicle. The spare camera 181-1 is good enough if it is capable of capturing the landscape of the forward direction of the vehicle, and the image displaying unit 181-1 may also be good enough if it is able to display the landscape of the forward direction of the vehicle and has a function that allows the driver to confirm the forward view.

Figure 21:
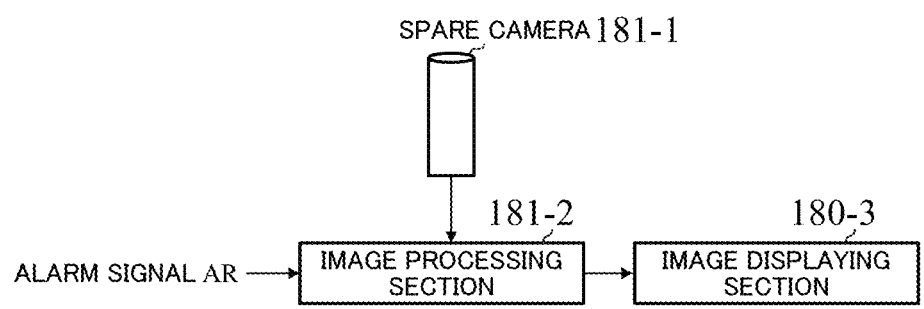
FIG. 21 is a block diagram to show a processing example (the second example) of the alarm signal.

FIG. 21 shows a processing construction of the second example. Normally, the image processing unit 181-2 is not working, and the image is not displayed on the image displaying unit 181-3. Then, when the alarm signal AR is inputted, the power is automatically turned on, the image signal from the spare camera 181-1 is processed by the image processing unit 181-2, and the image or the landscape ahead is projected on the image displaying unit 181-3. Therefore, the driver can move the vehicle to a safe stop position while viewing the image of the image displaying unit 181-3.

Further, as the third example, the dual system of FIG. 16 may be a triple system, but in this case, three camera systems are also required. Furthermore, the first to third examples may be combined as appropriate.

Here, the optical fiber is effective when transmitting an analog optical image and when transmitting a light itself. Instead of using a CMOS (Complementary MOS) sensor or a CCD (Charge-Coupled Device) sensor, there is a method in which the light collected by the condenser lens is sent as it is through the optical fiber, diffused by the lens at the outlet, and projected on the display unit. However, this method has low image accuracy and is not suitable for the present invention. In the case of a visible light CMOS sensor, an analog to digital (A/D) converter is often fabricated on the same die using the same technology as the sensor, but in the case of the CCD sensor, it is a separate chip. However, the optical fiber is required when the irradiation light installed somewhere is lead to the side of the sensor, and is emitted from the side of the sensor through the lens, and the reflected light is captured by the sensor as an image. In the case of the visible light, headlights and sunlight work as the irradiation light, so even if the irradiation light is used, it is only auxiliary light, but in the case of the infrared light, the irradiation light is indispensable because the infrared light needs to be generated artificially to have enough intensity. It is necessary to install the infrared irradiation light next to the infrared light wide-angle sensors 150-1 and 150-2. This infrared irradiation light is made of infrared LEDs, and 10 to 20 LEDs are often installed around the sensor in surveillance cameras, etc., and the infrared light wide-angle sensors 150-1 and 150-2 need to have these infrared LEDs around them. It is necessary to use a sensor with the LEDs, since the LEDs require a large amount of current, either place them near the dashboard and send power to the LEDs with copper wires, or place the power supply and the LEDs near the dashboard and lead infrared rays to the side of the sensor via the optical fiber for the transmission.

The vehicle of the present invention may be provided with a wireless communication unit and may perform wireless communication with an external data center, a roadside unit, another vehicle, or the like. For example, a mobile phone network (cellular network), a wireless LAN, an ETC (Electronic Toll Collection System), DSRC (Dedicated Short Range Communications), V2I (Vehicle-to-Infrastructure), V2V (Vehicle-to-Vehicle), or others can be used.

Figure 22:
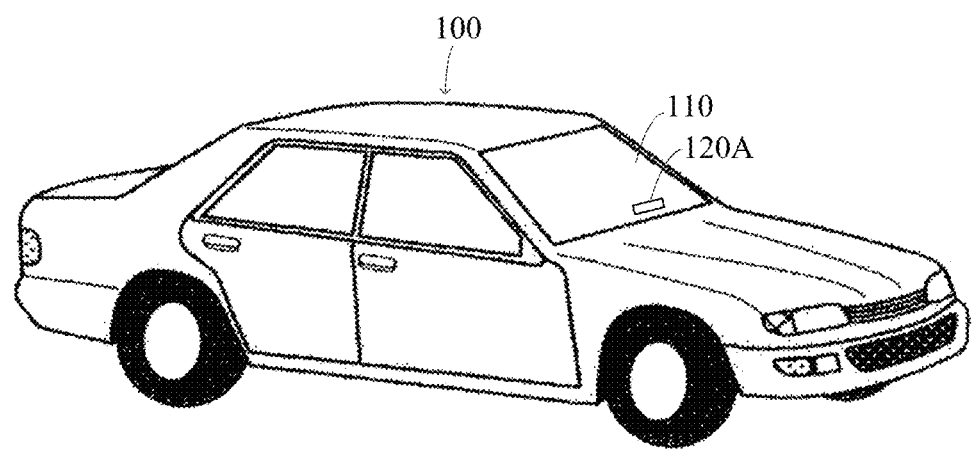
FIG. 22 is a perspective view to show another embodiment of the present invention.

In the above-described embodiments, the sensor system comprises of the visible light wide-angle sensor and the infrared light wide-angle sensor, but only the visible light wide-angle sensor system may be used. Further, in the above-described embodiments, the wide-angle sensor members are moved up and down to adjust the height, but they may be installed in a fixed place as shown in FIG. 22, for example.

In the present invention, the captured image captured by the wide-angle sensor is displayed on the display unit of the image displaying section, and the captured image is a forward view of the vehicle running. Therefore, the display unit does not need to provide a separate capturing camera. It is also possible to detect a dangerous object (for example, a person crossing the front) using the inputted video signal and to notify it to the driver.

For example, as disclosed in Japanese Unexamined Patent Publication No. 2007-48249 A, an intelligent video surveillance system is configured by using an intelligent video analysis system capable of analyzing element-by-element units of a monitored object in a video, and the behavior of the monitored object can be monitored using the analysis function of the analysis system. Further, as disclosed in Japanese Unexamined Patent Publication No. 2017-142795 A, it is possible to improve the traffic safety of children if an evaluation means configured to be able to take out an object related to a child from a captured image depending on the distance to the associated object together with a control means configured to initiate collision prevention measures for at least one vehicle against a person to whom the associated object belongs and who may appear suddenly. Furthermore, as disclosed in Japanese Patent Publication No. 2006-285385 A, ACTIT (Automatic Construction of Tree-structural Image Transformations) can automatically optimize a processing program in which various image filters are combined in a tree structure by genetic programming. In addition to extending the above method from moving images to specific symmetric extraction, it is possible to accurately extract moving objects from moving images by incorporating the optical flow method.

Still further, although the passenger car has been described in the above-described embodiment, the vehicles of the present invention can be similarly applied to all road (including highways and agricultural roads) running vehicles such as taxis, trucks, dump trucks, trailers, buses, wagons, SUVs, and small one- or two-seat vehicles.

EXPLANATION OF REFERENCE NUMERALS

1, 10, 20 driving seat
2, 11, 21 front glass
3, 12, 22 wiper
100 vehicle (passenger car)
102 handle (steering wheel)
110 image displaying section
111 display unit]
112 shielding plate
120, 120A wide-angle sensor member
123-1, 123-2 belt
124 rotation converting section
125 driving motor
126 mounting table
130 brightness sensor
140-1, 140-2 visible light wide-angel sensor
150-1, 150-2 infrared light wide-angel sensor
160 operating section
170 wide-angle sensor position indicating section
180-1 lamp blinking section
180-2 hazard lamp
180-3 brake acting section
810-4 brake
200, 300 control section
200M main control section
200S sub control section
210, 210M, 210S, 301 CPU
220, 220M, 220S image synthesis processing section
230, 230M, 230S display control section
240, 240M, 240S driving control section
250, 304 switching control section
260, 260M, 260S sensor-abnormality detecting section

The invention claimed is:

1. A vehicle having no wiper, wherein an image displaying section is provided at a forward portion of a driving seat of said vehicle, a capturing means to capture road conditions of a vehicle forward direction is provided in front of said vehicle, an image display surface of said image displaying section is located in interior side of said vehicle, a captured image captured by said capturing means is displayed on said image display surface, and a driver drives while viewing said captured image displayed on said image display surface,
   wherein said capturing means comprises a first visible-light sensor and a first infrared-light sensor being a main light system, a second visible-light sensor and a second infrared-light sensor being a sub light system,
   wherein an image processing means performs an image synthesis process of said main light system and said sub light system and generates an image signal, and
   wherein said captured image is displayed on said image display surface based on said image signal.

2. The vehicle having no wiper according to claim 1,
   wherein there is provided a brightness sensor to measure an external brightness of said vehicle, and a brightness of said captured image is adjusted in accordance with a brightness signal from said brightness sensor.

3. The vehicle having no wiper according to claim 2,
   wherein said capturing means is capable of moving up and down and is adjustable in a height by an operating section.

4. The vehicle having no wiper according to claim 1,
   wherein said image processing means performs a first image synthesis process of said first visible-light sensor and said first infrared-light sensor being said main light system and performs a second image synthesis process of said second visible-light sensor and said second infrared-light sensor being said sub light system.

5. The vehicle having no wiper according to claim 1,
   wherein said image processing means comprises:
   a first image processing means to perform a first image synthesis process of said first visible-light sensor and said first infrared-light sensor being said main light system;
     a second image processing means to perform a second image synthesis process of said second visible-light sensor and said second infrared-light sensor being said sub light system; and
   a control section to control said first image processing means and said second image processing means.

6. The vehicle having no wiper according to claim 1,
   wherein said vehicle has a function of a drive recorder to record said image signal and to detect an dangerous object by processing said image signal.

7. A vehicle having no wiper, comprising:
   an image displaying section which comprises a shielding plate located at a vehicle forward side and a display unit located at a forward portion of a drive seat in interior side of said vehicle, and which is provided in a front portion of said vehicle;
   a sensor member which includes a first visible-light sensor and a first infrared-light sensor being a main light system and a second visible-light sensor and a second infrared-light sensor being a sub light system to capture road conditions of a vehicle forward direction, and which is arranged on said shielding plate;
   an image synthesis processing means to image-synthesis-process respective video data from said first visible-light sensor and said first infrared-light sensor and said second visible-light sensor and said second infrared-light sensor and to generate an image signal, and to display said captured image on said display unit based on said image signal; and
   a sensor abnormality detecting section to detect an abnormality of said main light system,
   wherein said sensor member has a construction to cover above of said first visible-light sensor and said first infrared-light sensor and said second visible-light sensor and said second infrared-light sensor,
   wherein a driver drives while viewing said captured image displayed on said display unit, and
   wherein said main light system is ordinary operated, and said main light system is switched to said sub light system when an abnormality of said main light system is detected by said sensor abnormality detecting section.

8. The vehicle having no wiper according to claim 7,
   wherein there is provided a brightness sensor to measure an external brightness of said vehicle, and a brightness of said captured image is adjusted in accordance with a brightness signal from said brightness sensor.

9. The vehicle having no wiper according to claim 8,
   wherein when an abnormality of said sub light system is occurred, hazard lamps are blinked and a break is gradually applied.

10. The vehicle having no wiper according to claim 8,
   wherein said image synthesis processing means comprises:
   a first image processing means to image-process a first video data of said main light system;
   a second image processing means to image-process a second video data of said sub light system; and
   a control section to control said first image processing means and said second image processing means and which has a function to detect an occurrence of an abnormality, and
     wherein said control section further ordinarily enables said main light system and said first image processing means, and which enables by switching from said main light system and said first image processing means to said sub light system and said second image processing means when said abnormality is detected.

11. The vehicle having no wiper according to claim 8,
   wherein said vehicle has a function of a drive recorder to record said image signal and to detect an dangerous object by processing said image signal.

12. The vehicle having no wiper according to claim 7,
   wherein said sensor member is movable up and down, and there is provided a sensor-position indicating section to indicate a position of said sensor member in an interior of said vehicle, and
   wherein a height of said sensor member is adjusted by an operating section mounted in said interior.

13. The vehicle having no wiper according to claim 12,
   wherein said vehicle has a function of a drive recorder to record said image signal and to detect a dangerous object by processing said image signal.

14. The vehicle having no wiper according to claim 7,
   wherein when an abnormality of said sub light system is occurred, hazard lamps are blinked and a break is gradually applied.

15. The vehicle having no wiper according to claim 7,
wherein said image synthesis processing means comprises:
a first image processing means to image-process a first video data of said main light system;
a second image processing means to image-process a second video data of said sub light system; and
a control section to control said first image processing means and said second image processing means and which has a function to detect an occurrence of an abnormality, and
wherein said control section further ordinarily enables said main light system and said first image processing means, and enables by switching from said main light system and said first image processing means to said sub light system and said second image processing means when said abnormality is detected.

16. The vehicle having no wiper according to claim 7,
wherein said vehicle has a function of a drive recorder to record said image signal and to detect an dangerous object by processing said image signal.

* * * * *